(12) United States Patent
Routh

(10) Patent No.: US 8,608,916 B2
(45) Date of Patent: Dec. 17, 2013

(54) ELECTROLYTIC CELL

(75) Inventor: Julian Routh, West Midlands (GB)

(73) Assignee: Severn Trent Services Limited, Minworth (GB)

( * ) Notice: Subject to any disclaimer, the term of this patent is extended or adjusted under 35 U.S.C. 154(b) by 450 days.

(21) Appl. No.: 12/441,964

(22) PCT Filed: Sep. 24, 2007

(86) PCT No.: PCT/GB2007/003591
§ 371 (c)(1),
(2), (4) Date: Nov. 19, 2009

(87) PCT Pub. No.: WO2008/035092
PCT Pub. Date: Mar. 27, 2008

(65) Prior Publication Data
US 2010/0116681 A1    May 13, 2010

(30) Foreign Application Priority Data
Sep. 23, 2006   (GB) .................................. 0618789.2

(51) Int. Cl.
*C25B 9/00* (2006.01)
*C25B 1/24* (2006.01)

(52) U.S. Cl.
USPC ......................................... 204/278; 205/501

(58) Field of Classification Search
USPC ..................... 204/272, 275.1, 277, 278, 227;
205/500, 501, 351, 498, 499
See application file for complete search history.

(56) References Cited

U.S. PATENT DOCUMENTS

| 4,469,576 | A | * | 9/1984 | Akazawa et al. ............. 204/237 |
| 5,753,098 | A | * | 5/1998 | Bess et al. ...................... 205/501 |
| 5,855,749 | A | * | 1/1999 | Kohut et al. .................. 204/270 |
| 5,868,911 | A | | 2/1999 | Blum et al. |
| 6,193,858 | B1 | * | 2/2001 | Hradil et al. .................. 204/222 |
| 6,468,412 | B2 | * | 10/2002 | Bryan et al. ................... 205/500 |
| 7,897,022 | B2 | * | 3/2011 | Simmons et al. ............. 204/255 |
| 2002/0108865 | A1 | * | 8/2002 | Bryan et al. ................... 205/556 |

FOREIGN PATENT DOCUMENTS

| CN | 2591050 Y | 12/2003 | |
| EP | 1625822 A1 * | 2/2006 | ............... A61B 1/12 |

* cited by examiner

*Primary Examiner* — Nicholas A Smith
*Assistant Examiner* — Ciel Thomas
(74) *Attorney, Agent, or Firm* — D'Ambrosio & Menon, PLLC; Usha Menon

(57) ABSTRACT

An electrolytic cell comprising an electrolysis vessel for receiving a liquid electrolyte that fills the vessel to a predetermined level, electrodes for passing an electric current through the electrolyte, a vent for allowing gases produced by the electrolytic process to leave the vessel and an air inlet means located substantially adjacent to the predetermined level for directing air into the vessel at a predetermined rate.

19 Claims, 1 Drawing Sheet

ELECTROLYTIC CELL

PRIORITY CLAIM

This Patent Application is the US National stage under U.S.C. 371 of PCT/GB2007/003591 filed Sep. 24, 2007, and designating the United States and claims priority to GB0618789.2, filed Sep. 23, 2006.

FIELD OF THE INVENTION

This invention relates to an electrolytic cell. In particular, it relates to an electrolytic cell for the production of Sodium Hypochlorite and a method of producing Sodium Hypochlorite.

BACKGROUND

Sodium Hypochlorite (NaClO) is typically used as a disinfectant or as a "bleach". It is also used to sanitise water at a water treatment works. In water treatment plants Sodium Hypochlorite is produced on site using a continuous process electrolytic cell. Sodium Hypochlorite can also be used to disinfect the water of swimming pools, which need to be treated regularly with disinfectants to ensure the water is of a suitable quality. Typically, Sodium Hypochlorite is purchased in solid crystalline form and used for disinfecting the water used in swimming pools.

It is also common for water to be stored in storage tanks in food production factories and supermarkets, for example, so that it can be utilised in the event of an interruption in the mains water supply. It is advantageous to maintain a store of water because an interruption in the mains water supply may cause a break in production, which is costly. Water delivered to a factory or supermarket by the mains water supply can, at least in the United Kingdom, be assumed to be suitably clean for use in the production of food, for example. It is less common for the water stored in storage tanks to be treated prior to use, as it is assumed that the quality of the water has not decreased during storage. However, the water that is stored in the storage tanks may be standing for a substantial time and thus it is possible that the stored water may become unsuitable for use in certain production processes.

SUMMARY

In one embodiment of this invention, Sodium Hypochlorite is produced on site so that stored water or swimming pool water can be disinfected as required. Prior to this invention, the type of electrolytic cell used at water treatment works was not suitable for the installations discussed above. This is primarily due to the large size of the cell and that hazardous gases (in particular Hydrogen) are produced as a by-product of the chemical reaction. The production of an explosive gas such as Hydrogen in a public building such as a swimming pool or in a factory can pose a substantial safety hazard.

The explosive limits of a gas are the lowest and highest concentration in air at which the ignition of the gas will occur. Below the lower explosive limit the gas is of an insufficient concentration for ignition. Above the higher explosive limit the potentially explosive gas and air mixture is too rich and thus it cannot ignite. The smaller the electrolytic cell, the more confined the space is wherein the gases can circulate. Thus, in a confined space there is more chance of the concentration of the gas exceeding its lower explosive limit, and therefore being prone to ignition.

According to a one aspect of the invention, an electrolytic cell comprises an electrolysis vessel for receiving a liquid electrolyte that fills the vessel to a predetermined level, electrodes for passing an electric current through the electrolyte, a vent for allowing gases produced by the electrolytic process to leave the vessel and an air inlet means located substantially adjacent to the predetermined level for directing air into the vessel at a predetermined rate.

Accordingly, the electrolytic cell can be compact and is safe to use, in particular for the production of Sodium Hypochlorite. The incoming air dilutes any hazardous gases, such as Hydrogen, as close to the surface of the electrolyte as possible. Thus, this arrangement reduces the risk of the concentration of Hydrogen present in the cell exceeding the lower explosive limit during the production of Sodium Hypochlorite.

Preferably the electrolytic cell of the invention is suitable for the production of Sodium Hypochlorite. Thus, the cell of the invention allows the relatively safe, small-scale production of Sodium Hypochlorite on site.

Preferably the cell operates on a batch process. Thus, the cell is filled with electrolyte, electrolysis is performed, and then it is emptied and refilled with fresh electrolyte. In the case of the production of Sodium Hypochlorite the electrolyte is salt water, typically at approximately 3% concentration.

Preferably the electrodes are concentric with each other. Preferably, the electrolytic cell includes a draught tube that surrounds the electrodes and promotes the circulation of electrolyte around the vessel.

Preferably, the vent is located at the uppermost point of the electrolytic vessel. Preferably, the predetermined level is located adjacent, but below, an overflow means. The overflow means prevents the electrolytic vessel becoming over filled.

Preferably, the overflow means and air inlet means share a conduit that is connected to the electrolytic vessel. Preferably the vessel includes an electrolyte inlet means. The electrolyte inlet means is adapted to fill the electrolytic vessel with fresh electrolyte. Thus, in the case of Sodium Hypochlorite production, brine is fed into the vessel through the inlet means.

Preferably the vessel includes a product outlet means adapted to allow the processed electrolyte to leave the vessel. Preferably, the product outlet means is connected to a product tank, which stores the product of the electrolytic process until it is required.

The overflow means may also be connected to the product tank.

Preferably, air pressure generation means is connected to the product tank such that air is blown through the product tank and into the vessel through the air inlet means. Preferably the predetermined rate of the air directed into the vessel is chosen in accordance with the rate of production of hazardous gas. As such, the rate needs to be sufficiently high to effectively dilute the hazardous gas or gases for the duration of the electrolytic process.

A second aspect of the invention comprises a method for the production of Sodium Hypochlorite using the electrolytic cell of the first aspect of the invention. The method can comprise the steps of;

filling the electrolytic vessel with an electrolyte of brine water to a predetermined level;
    applying a flow of air across the surface of the electrolyte;
    performing electrolysis on the electrolyte for a predetermined period of time;
    extracting the Sodium Hypochlorite produced by the electrolysis from the electrolytic cell.

During this method, the chance of a build up of explosive amounts of Hydrogen gas is very low because the Hydrogen is diluted by the flow of air as soon as leaves the surface of the electrolyte. This method operates effectively in a "batch" mode of operation.

There now follows by way of example only a detailed description of the present invention with reference to the accompanying drawings wherein;

BRIEF DESCRIPTION

DETAILED DESCRIPTION OF THE INVENTION

Figure 1:
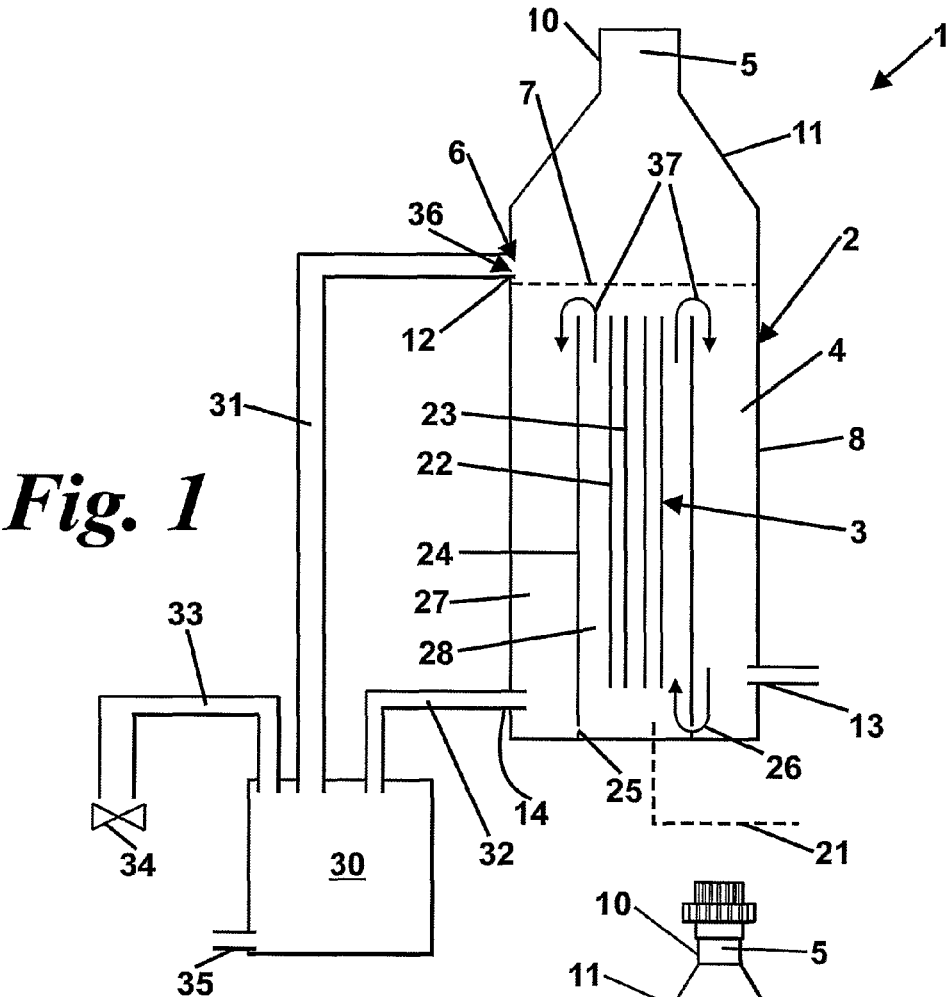
FIG. 1 shows a diagram view of an embodiment of the electrolytic cell of the invention.

An electrolytic cell 1 is shown in FIG. 1 and is adapted to produce Sodium Hypochlorite by the electrolysis of brine. The brine is typically of a concentration of 3% salt. In one embodiment of the invention, the cell 1 operates in a "batch" mode of operation wherein it is filled with brine (fresh electrolyte), the electrolysis is begun and once a sufficient concentration of Sodium Hypochlorite has been generated, the cell is emptied of the products of the electrolysis (product electrolyte).

The electrolytic cell 1 comprises an electrolysis vessel 2 having electrodes 3 disposed therein. The vessel 2 is adapted to receive an electrolyte 4 of brine that surrounds the electrodes 3. The vessel 2 also includes a vent 5 and an air inlet means 6. The air inlet means 6 is located adjacent to the surface level of the electrolyte 4, which is represented by dashed line 7.

Figure 3:
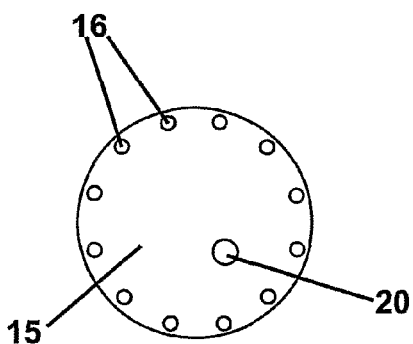
FIG. 3 shows an alternative embodiment of the invention as shown of FIG. 2.
Figure 2:
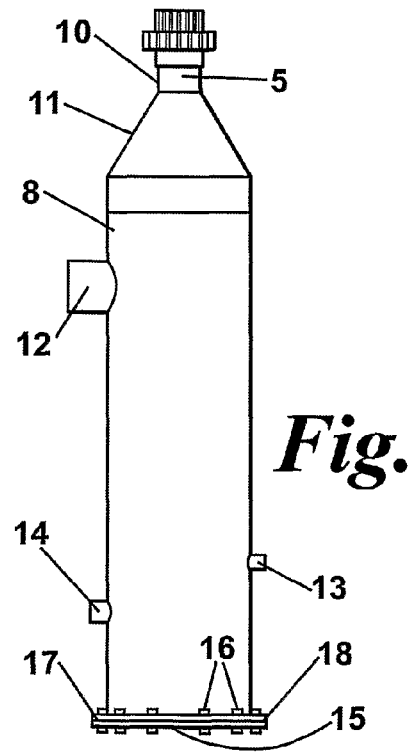
FIG. 2 shows an external view of the embodiment represented in FIG. 1.

The vessel 2 comprises a tubular body 8 having a vent tube 10 that defines the vent at the uppermost point. A tapering conical part 11 separates the vent tube 10 from the tubular body 8. In use, the vent tube 10 is connected to a waste gas system (not shown). The vessel 2 has a plurality of ports in the tubular body 2. In one embodiment, the electrolyte inlet means 13 such as a fill port 13, is connected to a means for filling the electrolytic vessel, piping for example, with fresh electrolyte 4. A product outlet means 14, a product port for example, is connected to a means for allowing the processed electrolyte to leave the vessel. An upper port 12 forms the air inlet means 6; the fill port 13 allows electrolyte 4 to be introduced into the vessel 2; and the product port 14 allows the product electrolyte to be extracted from the vessel 2. The vessel 2 also includes a base plate 15 (shown in FIGS. 2 and 3) that is secured to the tubular body part 8 by bolts 16. The bolts 16 pass through the plate 15 and are secured to an outwardly turned flange 17 on the tubular body 2. A sealing gasket 18 is located between the base plate 15 and the flange 17. The base plate 15 has an aperture 20 therein that allow the passage of an electricity supply cable 21. A gland (not shown) forms a seal between the cable 21 and the base plate 15. The cable 15 is connected (not shown) appropriately to the electrodes 3.

The electrodes 3 comprise a tubular anode 22 and a tubular cathode 23. The cathode 23 has a smaller diameter that the anode 22 and the cathode 23 is located concentrically within the anode 22. The electrodes 3 are adapted to be completely submerged in the electrolyte 4.

A draught tube 24 comprising a tubular member is mounted within the vessel 2 and is affixed to the base plate 15 by a spacing member 25. The spacing member 25 (represented by dashed lines) allows electrolyte 4 to flow from an area 27 outside of the draught tube 24 to an area 28 within the draught tube, as represented by arrow 26. However, it will be appreciated that electrolyte 4 could flow in the other direction. The spacing member 25 comprises a cross-shaped member and the draught tube 24 is seated thereon such that its peripheral circular edge bridges the arms of the cross-shaped member and the gaps therebetween. Thus, electrolyte can flow between areas 27 and 28 via the gaps between the arms of the spacing member 25. It will be appreciated that other arrangements of draught tube 24 will allow the flow of electrolyte around the tube 24. For example, the draught tube 24 may be affixed directly to the base plate 15 and have a plurality of apertures located circumferentially around it adjacent the base plate 15. In this embodiment (not shown), the spacing member 25 is not required as electrolyte 4 can flow through the apertures in the draught tube 24. The draught tube 24 is also adapted to be completely submerged in the electrolyte 4.

The upper port 12 and the product port 14 are connected to a product tank 30 by conduits 31 and 32 respectively. The product tank 30 is adapted to store the product electrolyte when it has been drained from the vessel 2 and prior to its use as a disinfectant or the like. The product tank also receives an air inlet conduit 33, which guides air under pressure into tank 30 and through conduit 31 and into the vessel 2 via the air inlet means 6. The incoming air is placed under pressure by a fan 34. It will be appreciated that other air pressure sources could be used, such as a compressor or pre-pressurised gas from a cylinder, for example. The product tank 30 also includes a product delivery outlet 35 to remove product from the product tank 30 for use.

The vessel 2 also includes an overflow means. In this embodiment the overflow means 36 comprises the upper port 12 and thus the overflow means 36 and air inlet means share the port 12. When the vessel 2 is filled with electrolyte 4 it is filled to the predetermined level 7 and the overflow means 36 is located adjacent to, but above, this predetermined level 7. This ensures both that any increases above the predetermined level results in the excess electrolyte being drained into the product tank 30, and also that the incoming air is directed over the surface of the electrolyte 4. Thus, any hazardous gases liberated during electrolysis are diluted by the incoming air as soon as the gas leaves the electrolyte 4. It will be appreciated that the air inlet means 6 and overflow means 36 may be coupled to the vessel at different ports. However, the present embodiment is advantageous as the flow of air through the product tank 30 and conduit 31 prevents the hazardous gas or gases entering the conduit 31 and product tank 30.

In use, a valve (not shown) is opened which allows electrolyte 14 to flow into the vessel 2 through port 13. The vessel 2 is filled until it reaches the predetermined level 7, where the electrodes 3 and the draught tube 24 are submerged and the upper port 12 is adjacent the surface of the electrolyte 14. The fan 34 is switched on to deliver the flow of air across the electrolyte surface and electricity is applied to the electrodes 3. The electrolysis of the brine causes the following reaction to occur;

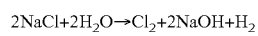

$$2NaCl+2H_2O \rightarrow Cl_2+2NaOH+H_2$$

The further side reaction also occurs thus producing Sodium Hypochlorite;

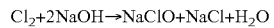

$$Cl_2+2NaOH \rightarrow NaClO+NaCl+H_2O$$

Hydrogen gas is the predominantly produced gas and will rise to the surface of the electrolyte from the electrodes 3 through area 28 within the draught tube 24. The rising gas promotes circulation of the electrolyte 4 in the direction of arrows 37 and 26. This is advantageous as it ensures any un-reacted electrolyte in area 27, for example, is urged nearer to the electrodes 3. The flow of air introduced by the air inlet means 6 dilutes the Hydrogen gas as it leaves the surface of the electrolyte 4. The flow rate of the inlet air is chosen to ensure any hazardous gases, such as Hydrogen, are sufficiently diluted to substantially reduce their hazardous effect. The diluted Hydrogen gas can then leave via vent 5 to a waste gas system (not shown). Once the electrolysis of the electrolyte has yielded a sufficient concentration of Sodium Hypochlorite the electricity supply to the electrodes is turned off. The fan 33 may also be turned off provided that the concentration of Hydrogen leaving the vent 5 is less than a predetermined level below the lower explosive limit. A valve in the product port (not shown) is then opened to allow the product electrolyte to leave the vessel 2 and enter the storage tank 30. The Sodium Hypochlorite solution can then be extracted from the product tank 30 via outlet 35 when required.

It will be appreciated that hazardous gases produced during electrolysis need not be diluted by air, and instead other gases such as Nitrogen may be used. Further, the gas acting as a diluting gas can be chosen in accordance with the particular hazardous gas produced by the given electrolytic reaction.

The invention claimed is:

1. An electrolytic cell comprising:
   an electrolytic vessel for receiving a liquid electrolyte, the electrolyte filling the electrolytic vessel to a predetermined level;
   one or more electrodes for passing an electric current through the electrolyte;
   a vent for allowing gases produced by the electrolytic process to leave the vessel; and
   an overflow means for maintaining the predetermined level of the electrolyte, wherein the predetermined level is located adjacent but below the overflow means; and
   an air inlet means located substantially adjacent to the predetermined level for directing air into the vessel and over the surface of the electrolyte maintained at the predetermined level, at a predetermined rate to dilute the gases produced by the electrolytic process as soon as they leave the surface of the electrolyte, and wherein the overflow means and the air inlet means share a conduit that is connected to the electrolytic vessel.

2. The electrolytic cell according to claim 1, wherein the electrolytic cell is a sodium hypochlorite electrolytic cell.

3. The electrolytic cell according to claim 1, wherein the electrolytic cell is adapted to operate on a batch process.

4. The electrolytic cell according to claim 1, wherein the electrolytic cell includes two or more electrodes, the two or more electrodes are concentric with each other.

5. The electrolytic cell according to claim 1, wherein the electrolytic cell comprises a draught tube.

6. The electrolytic cell according to claim 5, wherein a vent is located at the uppermost point of the electrolytic vessel.

7. The electrolytic cell according to claim 1, wherein the electrolytic vessel includes an electrolyte inlet means.

8. The electrolytic cell according to claim 7, wherein the electrolyte inlet means is connected to a means for filling the electrolytic vessel with fresh electrolyte.

9. The electrolytic cell according to claim 1, wherein the electrolytic vessel includes a product outlet means connected to a means for allowing a processed electrolyte to leave the vessel.

10. The electrolytic cell according to claim 9, wherein the product outlet means is connected to a product tank, which stores a product of the electrolytic process until it is required.

11. The electrolytic cell according to claim 10, wherein the overflow means is also connected to the product tank.

12. The electrolytic cell according to claim 10, wherein air pressure generation means is connected to the product tank such that air is blown through the product tank and into the electrolytic vessel through the air inlet means.

13. The electrolytic cell according to claim 1, wherein the predetermined rate of the air directed into the electrolytic vessel is chosen in accordance with a rate of production of hazardous gas.

14. The electrolytic cell according to claim 1 wherein the overflow means and the air inlet means share a port to the electrolytic vessel, the shared port for draining excess levels of the electrolyte and ensuring that the electrolyte is maintained at the predetermined consistent level.

15. The electrolytic cell according to claim 1, the electrolytic vessel comprising a tubular body and a vent tube, the vent tube and the tubular body separated by a tapering conical part.

16. A method for the production of sodium hypochlorite using the electrolytic cell defined in claim 1, the method comprising;
   filling the electrolytic vessel with an electrolyte to a predetermined level, the electrolyte comprising brine water;
   applying a flow of air across the surface of the electrolyte;
   performing electrolysis on the electrolyte for a predetermined period of time;
   extracting the sodium hypochlorite produced by the electrolysis from the electrolytic cell.

17. The method according to claim 16, wherein the brine water is at approximately 3% concentration.

18. The method according to claim 16, wherein the electrolytic cell operates on a batch process.

19. The method according to claim 16, wherein a predetermined rate of the air directed into the electrolytic vessel is chosen in accordance with a rate of production of hazardous gas.

* * * * *